United States Patent [19]
Nicol

[11] Patent Number: 5,862,029
[45] Date of Patent: Jan. 19, 1999

[54] RESETTABLE IMMERSION DETECTING CIRCUIT INTERRUPTER (IDCI)

[75] Inventor: John G. Nicol, Robbinsville, N.J.

[73] Assignee: Conair Corporation, Stamford, Conn.

[21] Appl. No.: 61,701

[22] Filed: Apr. 16, 1998

[51] Int. Cl.⁶ ..................................................... H02H 3/00
[52] U.S. Cl. .............................. 361/42; 361/45; 361/115
[58] Field of Search .................................. 361/42, 44, 45, 361/115, 88, 49

[56] References Cited

U.S. PATENT DOCUMENTS

| | | | |
|---|---|---|---|
| 5,148,344 | 9/1992 | Rao et al. | 361/42 |
| 5,198,955 | 3/1993 | Willner | 361/42 |
| 5,661,623 | 8/1997 | McDonald | 361/42 |

*Primary Examiner*—Jeffrey Gaffin
*Assistant Examiner*—Stephen W. Jackson
*Attorney, Agent, or Firm*—Paul J. Sutton

[57] ABSTRACT

A leakage current interrupter comprising a trip mechanism that operates automatically in response to the presence of a shock hazard condition. Actuation of the trip mechanism automatically interrupts the flow of current to a load and permits movement of a reset button to take place to visually signal that current to the load has been interrupted, although interruption of current flow is not in any way dependent on movement of the reset button, whereupon if movement of the reset button is prevented for any reason, the flow of current to the load is still automatically and instantaneously interrupted in response to the presence of a shock hazard. Such shock hazard exists when two separated shock hazard conductors in said load are bridged by a conductive material, such as water.

13 Claims, 7 Drawing Sheets

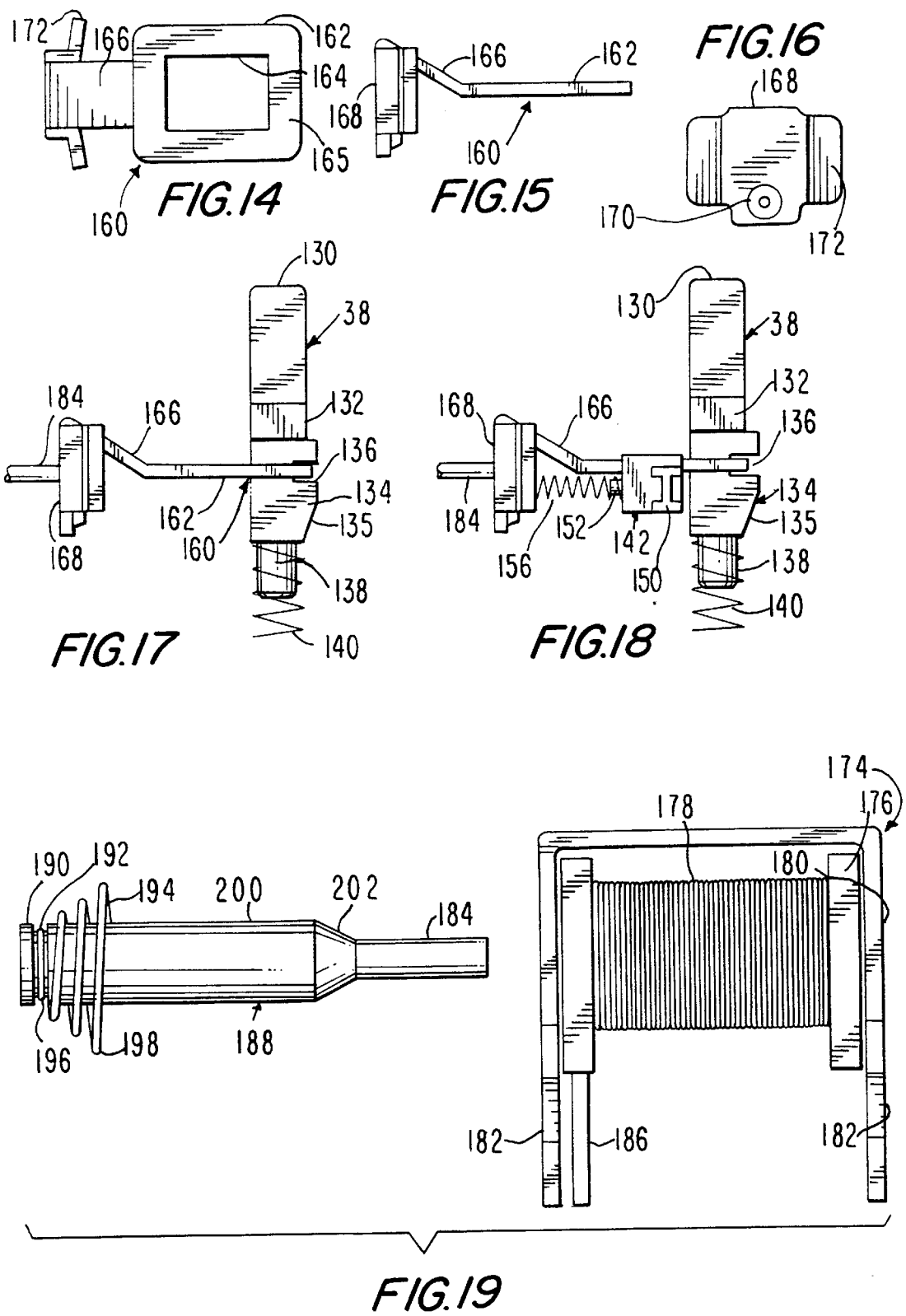

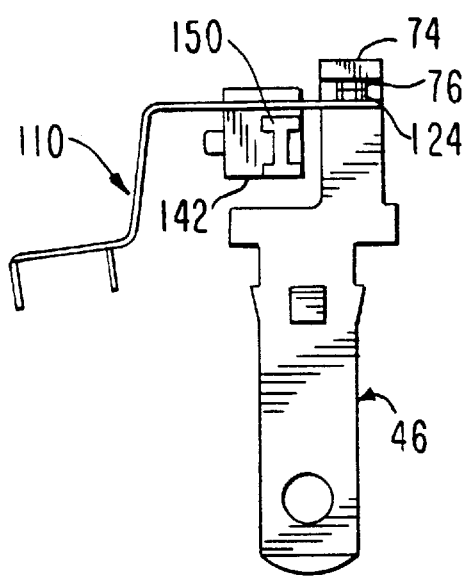
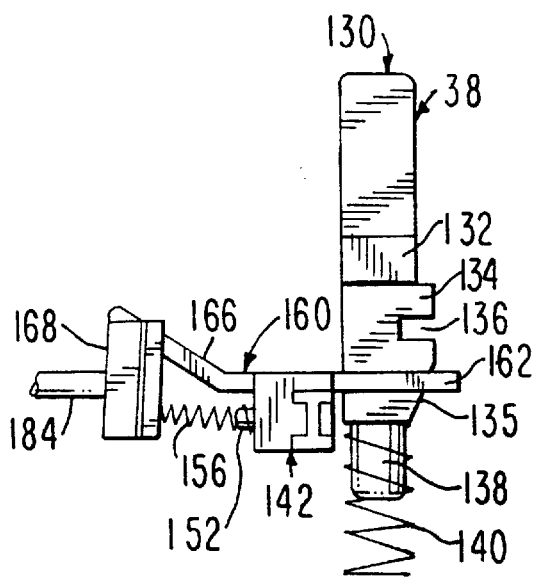
FIG.20  FIG.21
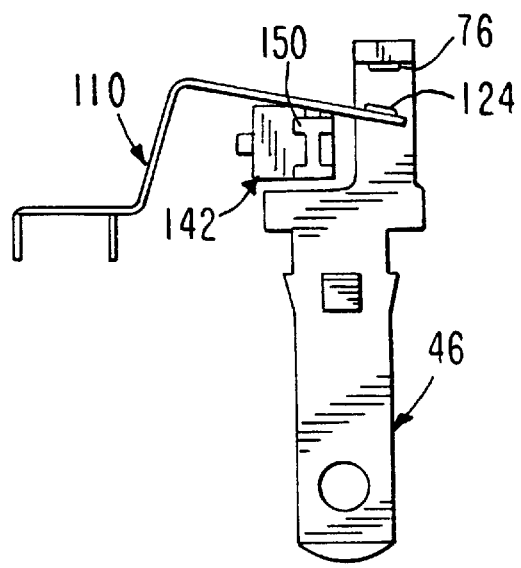
FIG.22

RESETTABLE IMMERSION DETECTING CIRCUIT INTERRUPTER (IDCI)

BACKGROUND OF THE INVENTION

1. Field of the Invention

The invention is directed to the field of shock hazard protection and more particularly to a circuit to detect the presence of a shock hazard in an appliance and a trip mechanism to remove the power to such appliances.

2. Description of the Prior Art

One prior art device employs a second set of contacts, momentary contacts, and a transistor to provide current to a relay coil to hold the main contacts closed. However, as soon as the reset button is depressed, the appliance power is restored before the device determines whether or not there is a shock hazard condition.

Another prior art device employs a ground fault detector to operate a trip mechanism to disconnect an appliance from a power source but does not recognize shock hazard conditions in the load.

SUMMARY OF THE INVENTION

The above noted deficiencies in the prior art are overcome by the instant invention that provides a simple device that can detect shock hazard conditions in a load and interrupt the flow of power to such load and prevent the re-application of power to the load until the shock hazard condition is removed. AC power is directed from an AC power source to two fixed contacts in the resettable IDCI. Two movable contacts, biased away from associated fixed contacts, are placed adjacent such fixed contacts. A switch operating device or contact actuator is placed adjacent the two movable contacts to move them to a closed position, each engaging its associated fixed contact or allowing said two movable contacts to move to an open position. A two position reset button having an extended position where the reset button extends out of the device housing as a visible signal of the fact that a shock hazard condition has occurred, and a reset position where said reset button is latched to said contact actuator to close said movable contacts with their associated fixed contacts and permit the flow of power to the load under non-shock hazard conditions. It is an object of the instant invention to provide a shock hazard condition detecting device which, in the presence of such condition in a load, prevents the flow of power to the load.

It is an object of the instant invention to provide a simple device to interrupt power to a load in the presence of a shock hazard condition in such load.

It is another object of the instant invention to provide a device to interrupt power to a load in the presence of a shock hazard condition in such load and which cannot be reset until the shock hazard condition is removed.

Other objects and features of the invention will be pointed out in the following description and claims and illustrated in the accompanying drawings, which disclose, by way of example, the principles of the invention and the best mode which is presently contemplated for carrying them out.

BRIEF DESCRIPTION OF THE DRAWINGS

In the drawings in which similar elements are given similar reference characters:

FIG. 14 is a top plan view of the latch of the device of FIG. 1.

FIG. 15 is a side elevational view of the latch of FIG. 14.

FIG. 16 is a front elevational view of the latch of FIG. 14.

FIG. 17 is a side elevational view of the reset button of FIG. 11 with the latch of FIG. 14 showing the reset button and latch engaged.

FIG. 18 is a side elevational view of the reset button of FIG. 11, the latch of FIG. 14 with the contact actuator of FIG. 12 in a latched position.

FIG. 19 is an exploded side elevational view of the actuating coil and plunger of the device of FIG. 1.

FIG. 20 is a side elevational view of the phase plug blade of FIG. 6 with the movable contact of FIG. 10 and the contact actuator of FIG. 12.

FIG. 21 is a side elevational view of the components of FIG. 18 in an unlatched position.

FIG. 22 is a side elevational view of the phase plug blade of FIG. 6, the movable contact of FIG. 10 and the contact actuator of FIG. 12 in an unlatched position.

DESCRIPTION OF THE PREFERRED EMBODIMENT

Figure 1:
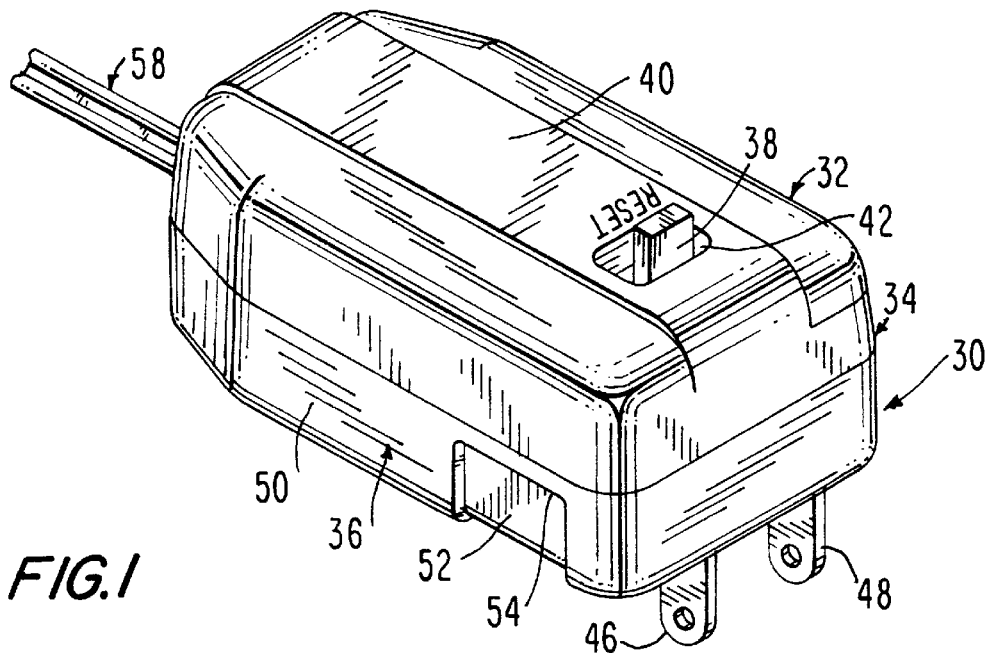
FIG. 1 is a top left perspective view of a resettable IDCI constructed in accordance with the concepts of the invention.
Figure 2:
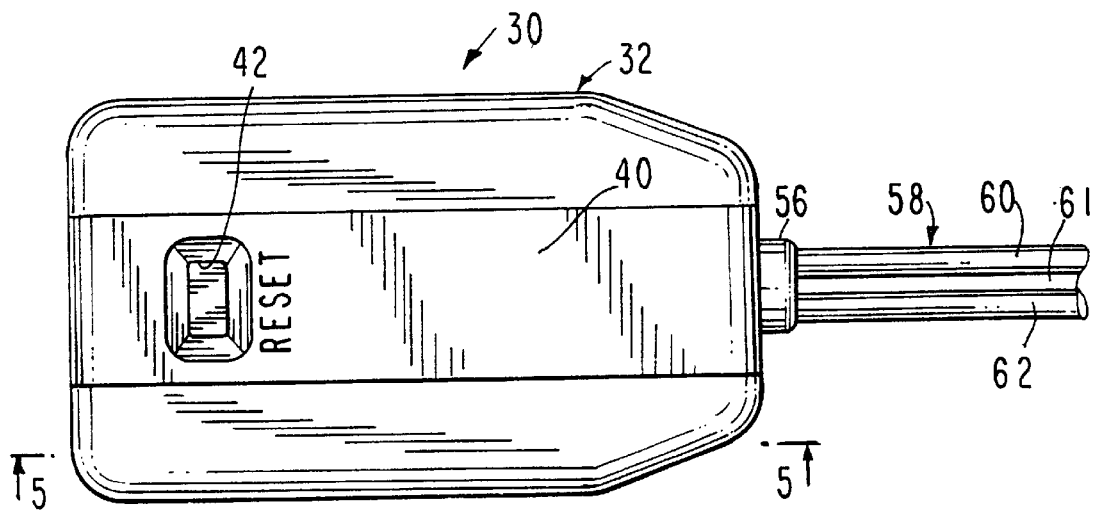
FIG. 2 is a top plan view of the device of FIG. 1 reversed.

Turning now to FIGS. 1 and 2, there is shown a resettable IDCI 30 constructed in accordance with the concepts of the invention. IDCI 30 takes the form of a plug which can be inserted into any standard receptacle and which is connected to the load to be supplied AC power. The load (not shown) may be described generally as an appliance but can be any electrical device used in areas where conductive materials are present. A housing 32 is constructed of an upper housing portion 34 and a lower housing portion 36. A reset button 38 projects through an aperture 42 in the top wall 40 of upper housing portion 34. The legend RESET is formed in top wall 40 adjacent button 38 by molding, engraving, stenciling, painting, etc. The button 38 may be colored or otherwise decorated to make it more visible. Extending through apertures in bottom wall 44 (not shown) is a phase plug blade 46 and a neutral plug blade 48. The neutral plug blade is wider than the phase plug blade to properly polarize the IDCI. Side wall 50 of lower housing portion 36 has a depression 52 leaving a shoulder 54 to assist in gripping IDCI 30 to remove it from a receptacle. A similar depression exists in the other side wall not visible in the figure. A split ring strain relief 56, as is well known in the art, fits within cutouts 212 and 228 in the rear wall of housing 32 and grips the multi-conductor cable 58 when housing portions 34 and 36 are joined. The bottom wall 44 also has apertures to receive fasteners to hold housing portions 34 and 36 in assembly. The multi-conductor cable 58 is made of a phase conductor 60, a neutral conductor 62 and a sense conductor 64.

Figure 6:
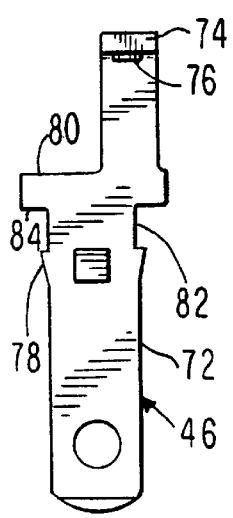
FIG. 6 is a side elevational view of the phase plug blade of the device of FIG. 1.
Figure 7:
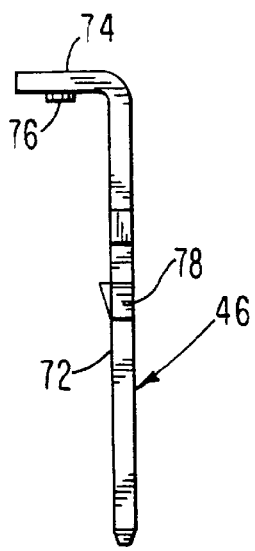
FIG. 7 is a front elevational view of the phase plug blade of FIG. 6.
Figure 8:
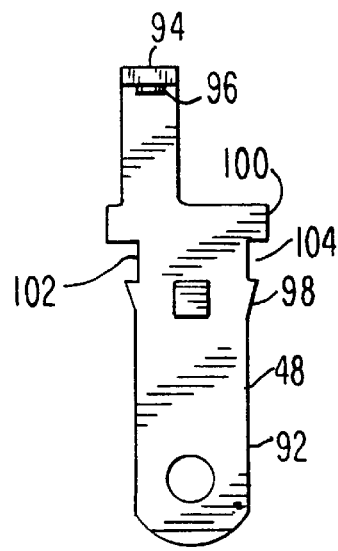
FIG. 8 is a side elevational view of the neutral plug blade of the device of FIG. 1.

Referring to FIGS. 6, 7 and 8 the fixed contacts are shown. FIGS. 6 and 7 show the phase plug blade 46 with its main body portion 72 and its generally right angle portion 74 which carries fixed contact 76. Blade 46 body portion 72 is of generally uniform width except for projections 78 and cross member 80. The projections 78 permit the blade 46 to expand the side walls of the aperture in which they are placed in bottom wall 44 until the walls are engaged in the region 82 between projections 78 and the lower edges 84 of cross member 80 and the blade 46 is fixed to bottom wall 44. The neutral plug blade 48 is generally the same as phase plug blade except that body portion 92 is wider than body portion 72 of blade 46. Blade 48 also has a right angle portion 94 which carries fixed contact 96. Blade 48 body portion 92 is of generally uniform width except for projections 98 and cross member 100. Blade 48 captures the walls about an aperture in bottom wall 44 between the projections 98 and the lower edges 104 of cross member 100 in the region 102.

Figure 9:
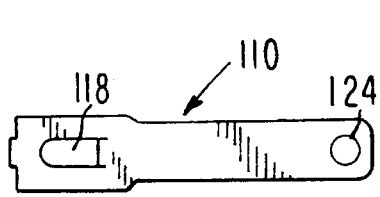
FIG. 9 is a top plan view of the movable contact of the device of FIG. 1.
Figure 10:
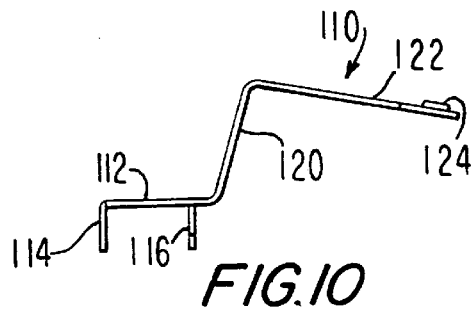
FIG. 10 is a side elevational view of the movable contact of FIG. 9.

Turning to FIGS. 9 and 10 the flexible blades 10 are shown. Blade 10 has a generally horizontal portion 112 with a right angle tab 114 formed by bending the end of portion 112 and a second tab 116 formed by severing a part of the portion 112 and bending it at right angles to the portion 112. The tabs 114, 116 are inserted into a printed circuit board (not shown) through suitable slots and crimped and soldered to such board. The recess 118 formed by the removal of tab 116 can be used to connect the conductors 58, 62 with then respective movable contacts 10. An intermediate portion 120 connects horizontal portion 112 with the flexible arm 122 which carries movable contact 124. The shape of blade 110 is so chosen that flexible arm 122 extends at an acute angle to the horizontal axis of the housing 32. As will be discussed below, this causes the movable contact 124 to separate from its associated fixed contact 76 whenever the contact actuator does not engage said flexible arm 122.

Figure 11:
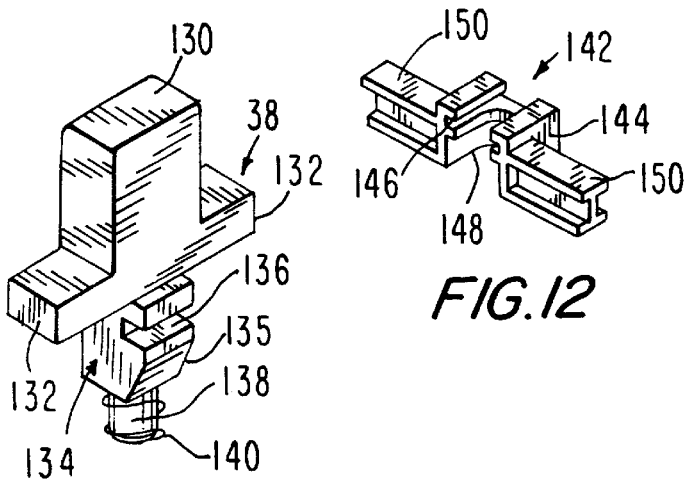
FIG. 11 is a top left perspective view of the reset button of the device of FIG. 1.

The reset button 38 is shown in FIG. 11. Button 38 has a contact portion 130 which can be depressed by a digit of an operator's hand, a pair of stop and guide shoulders 132, a body portion 134 which contains a latch slot 136 and a shaft 138 about which is placed a compression return spring 140. The body portion 134 is upwardly tapered as at 135 and adjacent latch slot 136.

Figure 12:
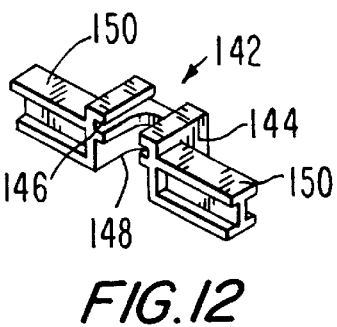
FIG. 12 is an upper left perspective view of the rear of the contact actuator of the device of FIG. 1.
Figure 13:
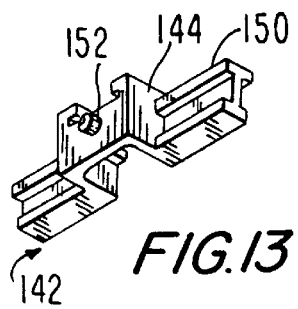
FIG. 13 is a lower left perspective view of the front of the contact actuator of FIG. 12.

FIGS. 12 and 13 show the contact actuator 142. Main body 144 has two slots 146 which will receive a latch member as will be explained below. A portion of main body 144 is removed as at 148 to accept the body portion 134 of the reset button 38. Extending outwardly from main body 144 and along a common axis are extensions 150. The extensions 150 are I-shaped and of a height less than main body 144 so that the latch member in the slots 146 will not be impeded. A small shaft 152 extends from the back face of body 144. As will be set forth, in more detail, a compression spring is partially wrapped about shaft 152 to reset the solenoid plunger as will be described below.

FIGS. 14, 15 and 16 show latch member 160 which has a latch blade 162 with a rectangular aperture 164 therein along a first horizontal axis. This aperture can be any shape to receive a similar cross section shaft, i.e., round. The blade 162 is dimensioned so that it can move along the slots 146 of the contact actuator 142. An inclined portion 166 connects blade 162 with an end section 168 which is bent at 90° to the plane of blade 162. As will be described below, the end of a plunger will be made to engage the back surface of end section 168 to unlatch the reset button 38. Formed on the front surface of end section 168 is a stub shaft 170 which receives one end of a reset compression spring 156, the other end of which fits over small shaft 152 of reset button 38 (see FIG. 18). Also formed at end section 168 are two wings 172 which extend generally at an acute angle with respect to inclined portion 166. These wings 172 engage stops in the lower housing portion 36 to limit the travel of the blade 162 along a longitudinal axis of the blade 162.

FIGS. 17, 18 and 21 illustrate the operation of the reset button 38 and the latch member 160, while FIGS. 18 and 21 also include the contact actuator 142. Assuming that the plunger 184 is not operated and is either not in contact with the back surface of end section 168 or does not exert any force upon such end section 168, the end wall 165 of the latch member 160 will be in slot 136 of the reset button 38. The button 38 is directed upwardly towards the upper housing portion 34 by the compression spring 140 which engages the inside surface of the bottom wall 44 and the shaft 138 of the reset button 38. The contact actuator 142 is shown in FIGS. 18 and 21. The blade 162 of the latch member 160 passes through slots 146 in the main body 144 and the end wall 165 of the latch member 160 will be in slot 136 of the reset button 38. A compression spring 156 extends between small shaft 152 on the contact actuator 142 and stub shaft 170 of latch 160 to move the plunger 184 towards its housing and position the end wall 165 in the latch slot 136. In this position the push button 38 is held in place against the forces of the spring 140 as it tries to expand and unite the contact actuator 142 and the reset button 38. The effect of FIG. 18 on the fixed contacts 46, 48 and the movable blades 110 are shown in FIG. 20. The movable contact 124 at the end of blade 110 is made to contact fixed contact 76 of fixed phase plug blade 46 by the operation of one of the contact actuator extension 150. Similarly, the other contact actuator extension 150 engages a movable blade 10 to cause engagement between movable contact 124 and fixed contact 96 of neutral phase plug blade 48.

When the plunger 184 is made to extend, due to shock hazard conditions, it engages the rear face of end section 168 and moves the latch member 160 to the right in FIG. 21, removing end wall 165 of blade 162 from slot 136 of the reset button 38 and positioning the body portion 134 of reset button 38 in the rectangular aperture 164. Since the reset button 38 is no longer restrained, the spring 140 expands to place the contact portion 130 further above the top surface of top wall 40 to signal that a hazard condition exists and that the load has been disconnected from the source of power. Also, since the spring 140 operates the contact actuator 142 via its connection to reset button 38 and this connection is severed, the extensions 150 no longer support and position the movable blades 110. The movable blades 110, being biased downwardly by their construction, move movable contacts 124 on blades 110 away from the fixed contact 76 of blade 46 and fixed contact 96 of blade 48, opening the phase and neutral conductors to the load as shown in FIG. 22.

Referring now to FIG. 19, there is shown an actuator coil 174 made up of a wire coil 178 wound upon a bobbin 176 and a plunger member 188. A housing 180 has apertures in its end walls 182 (not shown) and suitable bushings (not shown) are placed in the apertures to permit portions of the plunger member 188 to pass through. The ends of the end walls 182 are placed in suitable slots in the printed circuit board (not shown) and soldered to such board. Lead 186 will also extend through a slot in the board and be soldered to a suitable trace on the underside of the board. Plunger member 188 has a main section 200 of a first diameter and a plunger 184 of a second diameter, less than said first diameter. The transition 202 between main section 200 and plunger 184 provides a limit to how far plunger 184 can extend out of housing 180. Main section 200 has an annular recess 192 formed near one end resulting in a shoulder 190. A coil return spring 194 has a first end 196 in annular recess 192 to anchor the spring 194 to the main section 200. The diameter of spring 194 increases from one end 196 to the other end 198, so that end 198 engages an end wall 182 about an opening of housing 180. When coil 178 is energized it pulls the plunger member 188 to the right in FIG. 19 compressing the return spring 194. When the signal to the coil 178 is removed, the plunger member 188 is free to move within coil 178. The return spring 194 expands and moves the plunger member 188 to the left of FIG. 19. As the plunger member 188 moves to the right in FIG. 19, the plunger 184 is moved out of coil 178 through an aperture in the right end wall 182 of housing 180. The engagement of the transition 202 with the walls defining the aperture in the right end wall 182 limits how far plunger 184 can extend beyond right end wall 182. The plunger 184 is withdrawn into coil 178 as the return spring 194 expands.

Figure 3:
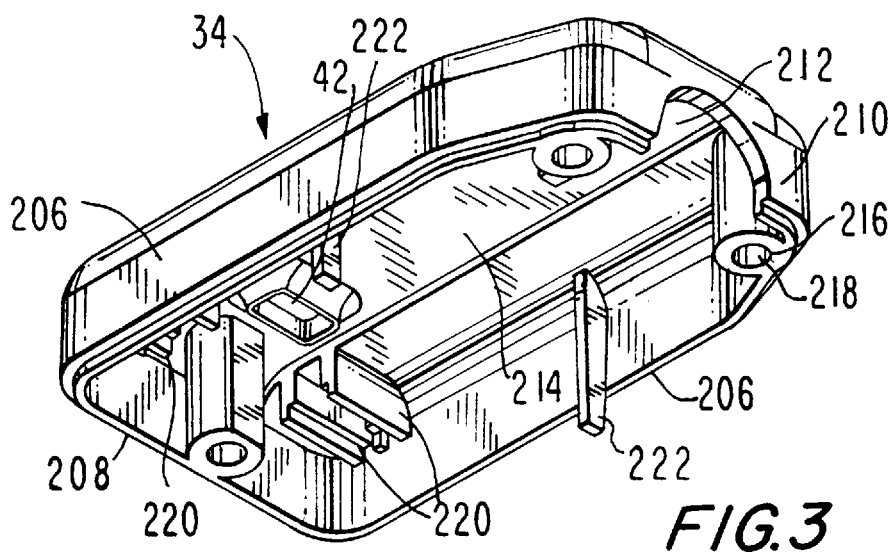
FIG. 3 i a bottom left perspective view of the interior of the upper housing portion of the device of FIG. 1.

FIG. 3 shows the interior of upper housing portion 34 with all the components removed. Upper housing portion 34 is made up of two side walls 206, a front wall 208, a rear wall 210 and a top wall 214 to form a six sided box open at its bottom wall. A cutout 212 is placed in rear wall 210 to received the strain relief 56. Three columns 216, each with an aperture 218 will receive fasteners to assemble upper housing portion 34 to lower housing portion 36. Flanking the aperture 42 on two sides are pairs of ridges 220. The ridges 220 of each pair are separated by a distance equal to the width of the right angle portions 74 and 94 of phase plug blade 46 and neutral plug blade 48, respectively. When the housing 32 is assembled, the right angle portions 74 and 94 enter the spaces between the ridges 220 which helps stabilize the phase and neutral plug blades 46 and 48. Two fingers 222 extend from the inside of the top wall 214 towards the open bottom surface of upper housing portion 34. The fingers 222 press the printed circuit board 70 (see FIG. 5) against the four steps 260 to fix the circuit board 70 in place when the upper housing portion 34 is joined with the lower housing portion 36. A rib 90 (see FIG. 5) engages wall 262 and aids in controlling the position of the plunger member 188 and reinforces wall 262.

Figure 4:
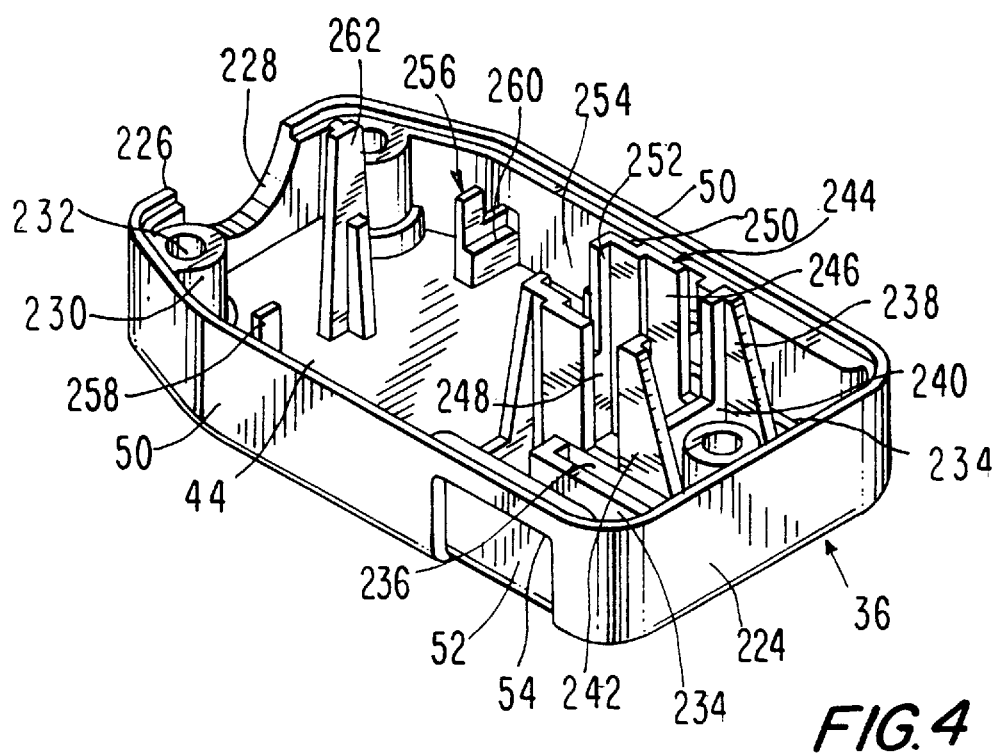
FIG. 4 is a top left perspective view of the interior of the lower housing portion of the device of FIG. 1.

Referring to FIG. 4, there is shown the interior of the lower housing portion 36. Lower housing portion 36 is made up of two side walls 50, a front end wall 224, a rear end wall 226 and a bottom wall 44 to form a six sided box open at its top wall. A cutout 228 is provided in rear wall 226 to accept the strain relief 56. Three columns 230, each with an aperture 232 therein will receive the fasteners (not shown) used to assemble housing 32. A raised rib 234 has a slot 236 therein to receive the cross member 80 and projections 78 of the phase plug blade 46. A similar raised rib 234 is arranged to receive the cross member 100 and projections 98 of the neutral plug blade 48. The engagement of projections 78 and 98 with the walls of the rib 234 prevents movement of blades 46 and 48, respectively, out of or further into lower housing portion 36.

Two triangular walls 238 extend from the inner surface of bottom wall 44 with a common wall 240 therebetween. The outward surfaces 242 of walls 238 provide back-up for the blades 46 and 48. Multi-section walls 244 are each made up of a first section 246 in line with walls 238 and separated by space 248. The space 248 acts as a guide for the movement of the extensions 150 of the contact actuator 142 and for shoulders 132 of the reset button 38. A further section 250, stepped inwardly from the inside surface of wall section 246 ends in a wall 252 joining the sections 250. A cutout 254 permits plunger 184 to reach the back side of end wall 168. The portions of wall 252 adjacent cutout 254 are engaged by wings 172 to limit movement of the latch member 160 towards the solenoid 174. The walls 240 and 252 provide strengthening for the walls 238 and 250.

Four stepped ribs 256 are provided on the inside surface of the bottom wall 44 arranged along side walls 50 and spaced in from front wall 224 and rear wall 226. Each of the ribs 256 has back member 258 and a step 260. The spacing between the ribs 256 is employed for the placement of the printed circuit board 70 (see FIG. 5). The edges of a printed circuit board 70 will be placed on step 260 and rest against back member 258. The number of ribs 256 can be increased to six to provide further support for the printed circuit board 70. Ribs 256 may be heat staked over the end of the circuit board in order to retain it during assembly. A further generally triangular wall 262 with reinforcement ribs is provided as a limit stop for the plunger member 188 when return spring 194 is controlling the movement of plunger member 188. Wall 262 also keeps the conductors 60 and 62 separated adjacent the strain relief 56.

Figures 23, 24:
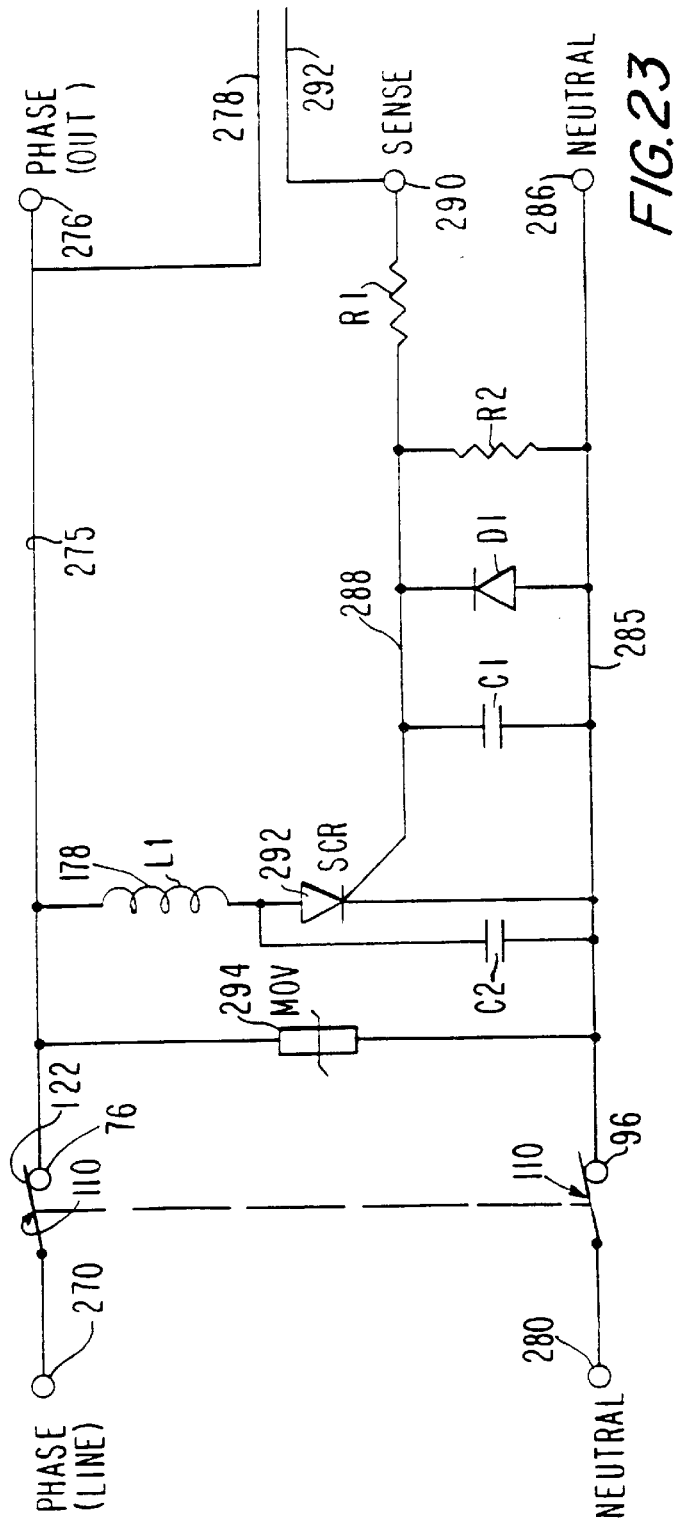
FIG. 23 is a schematic diagram of the electrical circuit of the device of FIG. 1.
FIG. 24 is a table of values for the components of FIG. 23.

FIG. 23 shows in schematic form the circuit to operate the IDCI 30. From a phase terminal 270 coupled to the phase line of an AC power source the phase terminal 270 is coupled to the movable contact 110. The fixed contact 76 is coupled by line 275 to the phase output line 276 and to a bare first shock hazard detection conductor 278. The neutral terminal 280 is coupled to the neutral line of the AC power source. The neutral terminal 280 is coupled to the movable contact 110. The fixed contact 96 is coupled to the neutral output terminal 286 by a line 285. A third line 288 couples the circuit to a sense terminal 290 and a bare second shock hazard detection conductor 292. A metal oxide varistor (MOV) 294 (see FIG. 5) is coupled across the lines 275, 285 and positioned between blades 46, 48 adjacent lower housing portion 36 to provide protection against surges in the AC power lines. The actuating coil 178 is connected from phase line 275 to the anode of a silicon controlled rectifier (SCR) 292 and the cathode is coupled to the neutral line 285. The gate of SCR 292 is connected to third line 288. A network of parallel elements is provided for noise immunity for the SCR. The network includes a capacitor C1 and a diode D1. One plate of capacitor C1 and the cathode of diode D1 are coupled to third line 288. The other plate of capacitor C1 and the anode of diode D1 are coupled to neutral line 285. Additional noise immunity is provided by capacitor C2 which extends from the anode to cathode across the SCR 292. A resistor R1 is coupled between line 288 and sense terminal 290 and a resistor R2 is coupled between sense line 288 and neutral line 285. The resistor network R1 and R2 control current and voltage to the gate of SCR 292. Typical values for the components of the circuit of FIG. 23 are shown in the table of FIG. 24. The unconnected ends of the first and second shock hazard detection conductors 278, 292, respectively, are located in the load which is also connected to the phase and neutral lines from the AC power source. If the load is a small appliance such a hair dryer it is possible that it will fall into a basin or tub of water. As soon as the water bridges the gap between bare conductors 278 and 292 a signal is applied to the gate of SCR 292. The signal applied to the gate of SCR 292 causes it to change from its normal non-conductive state to its shock hazard conducting state. Current is now conducted by the SCR 292 from line 275 to 285. The current through actuating coil 178 permits the movable contacts 110 to be separated from fixed contacts 76 and 96, respectively, opening the phase line 275 and neutral line 285. The movable contacts 110 can be closed by reset button 38 and will remain closed in the event the shock hazard detection conductors 278, 292 are no longer bridged. It should be understood that this system can be used for any appliance or device to be protected against shock hazards. The conductive medium does not have to be water but can be any conductive material. The conductors 278, 292 could be conducting plate lines on a printed circuit board or any other arrangement. The conductors 278, 292 will be placed adjacent any openings through which the conductive material can enter the device.

Figure 5:
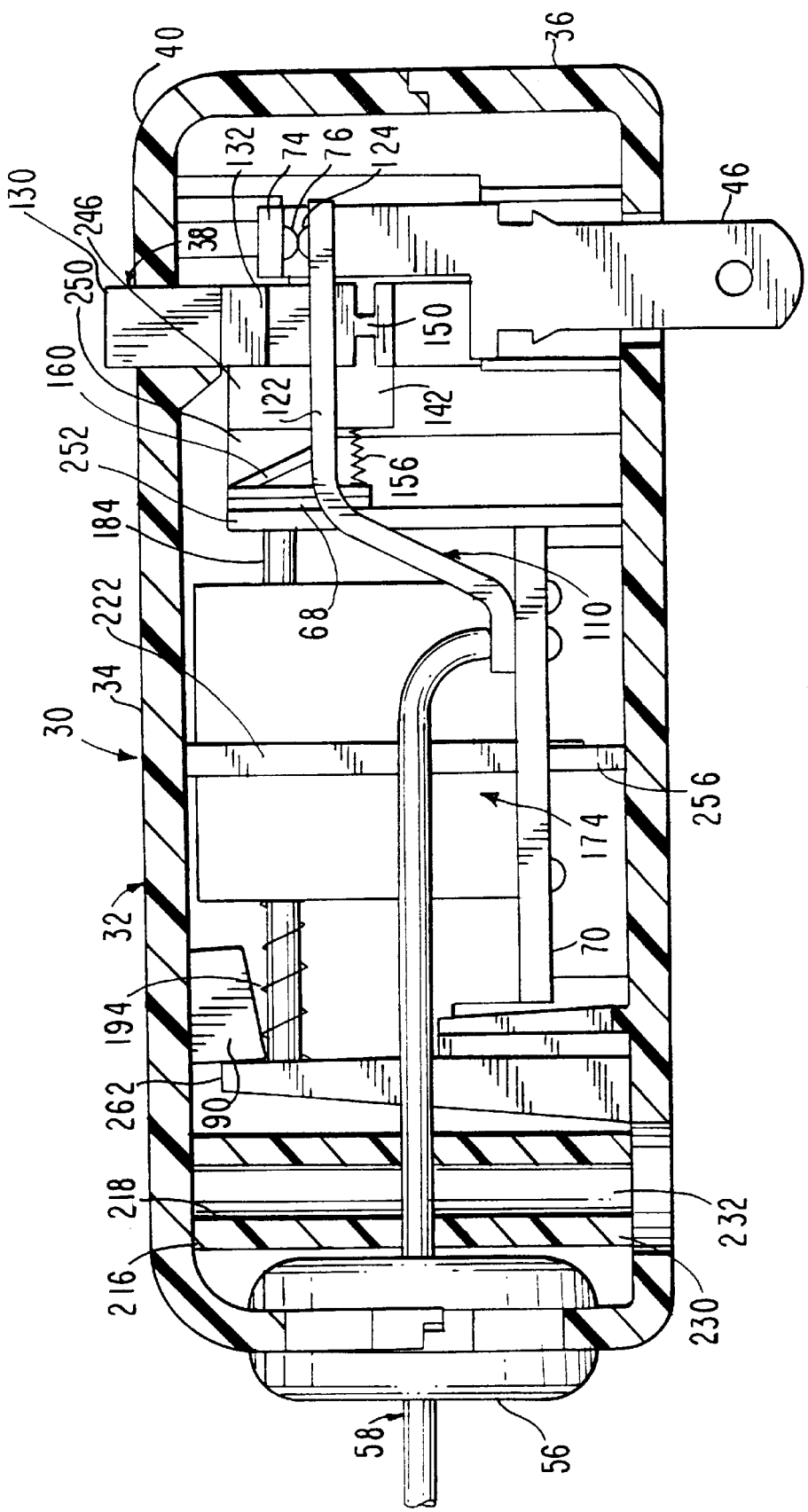
FIG. 5 is a side elevational view of the device of FIG. 1, in section, taken along the line 5—5 in FIG. 2.

Turning now to FIG. 5, the resettable IDCI 30 is shown in its reset state. The reset button 38 appears slightly above the surrounding top surface 40 of upper housing portion 34. The contact actuator 142 is coupled to the reset button 38 and the extensions 150 are in contact with the flexible blades 110. The contact actuator 142 pushes up on the flexible arm 122 to move movable contact 124 into contact with fixed contact 76 on the fixed blade 46 under the influence of compression spring 140 acting on the reset button 38 (not shown). Although not shown in FIG. 5, a movable contact 124 is made to engage fixed contact 96 of blade 48 at the same time as a contact 124 engages fixed contact 76. The plunger 184 is in its fully retracted position. The face of plunger 184 may contact the rear face of end section 168 but exerts no force on it. The compression spring 156 urges latch member 160 to the left in the latching position. The latch member 160 and the compression spring 156 would not normally be visible but were added to show the relative positions of these elements with respect to the flexible blade 110. The remainder of the latch member 160, namely latch blade 162 is directly behind the flexible blade 110 and is not visible. The plunger member 188 is partially withdrawn from energizing or actuator coil 174 due to the recovery of the compression spring 194 and the engagement of the end surface with wall 262. As shown in FIG. 23, the AC power source is supplying the load via the phase line 275 and the neutral line 285.

Upon the detection of a shock hazard condition, that is the flow of some current through the conductive medium above the trip levels set by resistance R1 and R2, a signal is applied to the gate of the SCR 292. The SCR begins to conduct and passes current to the actuator coil 178 of the solenoid 174. The flow of current in coil 178 causes the plunger member 188 to move to the right in FIG. 5 and causes plunger 184 to push against the rear surface of end section 168. The return spring 194 is compressed between shoulder 190 and the adjacent leg 182 of the housing 180. The movement of plunger 184 moves the latch member 160 to the left and compresses return spring 156 which is not strong enough to prevent the movement of latch member 160 due to the forces exerted by plunger 184. The latch blade 162 moves far enough to displace end wall 165 from the latch slot 136 separating the reset button 38 and the contact actuator 142. The contact actuator 142 cannot move because of the arms of latch blade 162 of latch member 160 in the slots 146 of contact actuator 142. However, with the body 134 of reset button 38 in aperture 164, the reset button 38 is free to move upwardly in FIG. 5 due to the expansion of compression spring 140. The top surface of the stop and guide shoulders 132 engages the inside surface 214 of upper housing portion 34 adjacent the aperture 42 to limit such upwards movement of the reset button 38. The contact actuator 142 having no independent forces applied to it, is forced downwardly by the action of the flexible blades 110 attempting to return to their initial conditions as shown in FIG. 10. This opens the engagement of movable contacts 124 with fixed contacts 76 and 96. As a result of the opening of the switches 124/76 and 124/96, the load and circuit are no longer connected to the AC power source and the possibility of injury is eliminated. The current is removed from the actuator coil 178 which releases plunger member 188 which is reset by the expansion of compression spring 194. The end section 168 moves to the left in FIG. 5 under the influence of expanding compression spring 156.

To reactivate the system, one has only to push downwardly on contact portion 130 of reset button 38. The inclined surface 135 of body portion 134 of reset button 38 moves the latch blade 162 to the right until the end wall 165 enters slot 136 at which time the compression spring 156 moves the latch member 160 to the left and unites the reset button 38 and the contact actuator 142.

If the hazard condition still exists, the IDCI 30 will repeat the above-described operations until the hazard condition is removed.

While there have been shown and described and pointed out the fundamental novel features of the invention as applied to the preferred embodiment, as is presently contemplated for carrying them out, it will be understood that various omissions and substitutions and changes of the form and details of the device illustrated and in its operation may be made by those skilled in the art, without departing from the spirit of the invention.

We claim:

1. In combination with an electrical load operatively connected to an AC source by an electrical cord set including a first and second electrical conductor, each having a source end and a load end, respectively, and a plug compatible with said AC source, a shock hazard preventing circuit comprising:

a) a third electrical conductor having a source end and a load end;

b) a first and a second shock hazard detection conductor each having a connected end and an unconnected end, respectively, positioned in a non-contacting relationship and contained within a load, the connected end of said first shock hazard detection conductor being connected to the load end of said first electrical conductor, the connected end of said second shock hazard detection conductor being connected to the load end of said third electrical conductor, and the unconnected ends of said first and second shock hazard detection conductors being maintained in a spaced-apart relationship;

c) an interrupting circuit contained within said plug and including an actuator coil and a first and second switch responsive to the flow of current through said actuator coil, said first switch being operable between a normally closed position and a shock hazard condition open position and connected in-line with said first electrical conductor, said second switch being operable between a normally closed position and a shock hazard condition open position and connected in-line with said second electrical conductor;

d) a switching control circuit contained within said plug and including a silicon controlled rectifier operable between a normally non-conducting state and a shock hazard condition conducting state, a first resistor connected in series between a gate of said silicon controlled rectifier and the source end of said third electrical conductor, and network means comprising a second resistor, a diode and a capacitor connected in parallel with each other coupled between said gate and a cathode of said silicon controlled rectifier for providing noise immunity and damage protection to said silicon controlled rectifier;

e) reset means contained within said plug to return said first and second switches to said normally closed position from said shock hazard condition open position, said reset means including a depressible button having a first end and a second end and a body therebetween, said first end adapted to be pushed by a digit of the hand to depress said depressible button and said second end coupled to a resilient member opposing the depression of said button and a slot across said body of said depressible button;

f) operating means contained within said plug for moving said first and second switches to said normally closed position;

g) latch means contained within said plug coupling said depressible button to said operating means and controlled by said actuator coil to move said latch means between a latched position where said depressible button is coupled to said operating means and an unlatched position where said depressible button is uncoupled from said operating means whereby said resilient member causes said operating means to move said first and second switches to said normally closed position; and h) the immersion in an electrically conductive medium of the unconnected ends of said first and second shock hazard detection conductors provides an electrically conductive path between said first and second shock hazard detection conductors causing a signal on said third electrical conductor to be operatively connected to said gate of said silicon controlled rectifier resulting in the switching of said silicon controlled rectifier from the normally non-conducting state to the shock hazard condition conducting state thereby providing a path for current flow through said actuator coil and moving said latch means to said unlatched position causing said first and second switches to switch from the normally closed position to the shock hazard condition open position and thus operatively disconnecting said AC source from said electrical load.

2. The combination recited in claim 1, further comprising a metal oxide varistor across said first and second electrical conductors.

3. The combination recited in claim 1, wherein said resilient member is a compression spring.

4. The combination as recited in claim 1, wherein said third conductor is coupled to one plate of said capacitor, one side of said second resistor and the cathode of said diode and said second conductor is coupled to the other plate of said capacitor, the second side of said second resistor and the anode of the diode.

5. The combination recited in claim 1, further comprising:

a) plunger means operated by said actuator coil between a retracted position when no current is flowing through said actuator coil and an extended position when current is flowing through said actuator coil, said extended position of said plunger means engaging said latch means and moving said latch means to said unlatched position.

6. The combination recited in claim 5, further comprising:

a) a plunger means resetting member to move said plunger means to said retracted position when current no longer flows through said energizing coil; and b) a latch means resetting member coupled to said latch means to move said latch means to said latched position when current no longer flows through said actuator coil.

7. The combination recited in claim 6, further including a stop to limit the motion of said plunger means when operated by said resetting member.

8. The combination recited in claim 1, further comprising:

a) a lower housing portion having a bottom wall, two side walls and two end walls, said walls joined to one another to form a five sided enclosure open at its top wall;

b) an upper housing portion having a top wall, two side walls and two end walls, said walls joined to one another to form a five sided enclosure open at its bottom wall;

c) said lower housing portion and said upper housing portion forming a complete housing when fastened together with said open bottom wall of said upper housing portion adjacent said open top wall of said lower housing portion, said complete housing containing at least said interrupting circuit, said switching control circuit, said reset means and said latch means.

9. The combination recited in claim 8, having:

a) a first aperture in said top wall of said upper housing portion through which said depressible button extends for contact from outside of said complete housing;

b) said depressible button when depressed while said latch means is in the latched position causing the coupling of said depressible button and said operating means.

10. The combination recited in claim 8, further comprising:

a) two fixed contact means mounted to said bottom wall of said lower housing portion having fixed contact portions in said housing and blade portions extending through apertures in said bottom wall of said lower housing portion, said blade portions permitting said plug to be inserted into a standard receptacle for coupling to the phrase and neutral conductors of an AC source, each of said two fixed contacts forming a fixed part of said first and second switches; and b) two movable contact means mounted within said lower housing portion, each having a resilient arm with a movable contact thereon, a first of said two movable contact means coupled to said first electrical conductor and the second of said two movable contact means coupled to said second electrical conductor; and c) each of said movable contacts in contact with a different one of said two fixed contacts when said latch means couples said depressible button to said operating means.

11. The combination as recited in claim 10, wherein:
a) said resilient member is a compression spring of a first spring factor; and
b) each of said resilient arms are cantilever springs having a second spring factor less than said first spring factor whereby said resilient arms move said movable contacts away from said associated fixed contacts when said latch means is in its unlatched position.

12. The combination as recited in claim 11, further comprising:
a) a printed circuit board;
b) first means to couple the source end of said first electrical conductor to said printed circuit board and a first of said two resilient arms; and
c) second means to couple the source end of said second electrical conductor to said printed circuit board and the second of said two resilient arms.

13. The combination as recited in claim 12, wherein said actuator coil is mounted on and connected to said printed circuit board.

* * * * *